US011499036B2

(12) United States Patent
Landreau et al.

(10) Patent No.: US 11,499,036 B2
(45) Date of Patent: Nov. 15, 2022

(54) RUBBER COMPOSITION COMPRISING AN EPOXIDE RESIN AND A SPECIFIC AMINE HARDENER

(71) Applicant: COMPAGNIE GENERALE DES ETABLISSEMENTS MICHELIN, Clermont-Ferrand (FR)

(72) Inventors: Emmanuel Landreau, Clermont-Ferrand (FR); Philippe Laubry, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 181 days.

(21) Appl. No.: 16/314,100

(22) PCT Filed: Jun. 29, 2017

(86) PCT No.: PCT/FR2017/051749
§ 371 (c)(1),
(2) Date: Dec. 28, 2018

(87) PCT Pub. No.: WO2018/002538
PCT Pub. Date: Jan. 4, 2018

(65) Prior Publication Data
US 2019/0241722 A1    Aug. 8, 2019

(30) Foreign Application Priority Data

Jun. 30, 2016  (FR) .................................... 1656142

(51) Int. Cl.
| | | |
|---|---|---|
| C08L 9/00 | (2006.01) | |
| B60C 1/00 | (2006.01) | |
| C08L 7/00 | (2006.01) | |
| C08L 63/00 | (2006.01) | |
| C08K 3/013 | (2018.01) | |
| C08G 59/50 | (2006.01) | |
| C08K 3/04 | (2006.01) | |
| C08L 63/04 | (2006.01) | |
| C08G 59/06 | (2006.01) | |
| C08G 59/24 | (2006.01) | |

(52) U.S. Cl.
CPC .................................. *C08L 9/00* (2013.01); *B60C 1/00* (2013.01); *B60C 1/0008* (2013.01); *B60C 1/0016* (2013.01); *B60C 1/0041* (2013.01); *C08G 59/5033* (2013.01); *C08K 3/013* (2018.01); *C08K 3/04* (2013.01); *C08L 7/00* (2013.01); *C08L 63/00* (2013.01); *C08L 63/04* (2013.01); *B60C 2001/005* (2013.01); *B60C 2001/0066* (2013.01); *B60C 2001/0075* (2013.01); *C08G 59/063* (2013.01); *C08G 59/245* (2013.01)

(58) Field of Classification Search
CPC ...... C08K 3/013; C08K 3/04; C08G 59/5033; C08G 59/063; C08G 59/24; C08L 63/04; B60C 1/0016; B60C 1/0041; B60C 2001/005

See application file for complete search history.

(56) References Cited

U.S. PATENT DOCUMENTS

| | | | |
|---|---|---|---|
| 5,393,806 A * | 2/1995 | Azarnia | C08G 59/5033 |
| | | | 523/400 |
| 5,718,788 A | 2/1998 | Chauvin et al. | |
| 5,763,558 A | 6/1998 | Chauvin et al. | |
| 5,977,238 A | 11/1999 | Labauze | |
| 6,013,718 A | 1/2000 | Cabioch et al. | |
| 6,098,711 A | 8/2000 | Chatterji et al. | |
| 6,503,973 B2 | 1/2003 | Robert et al. | |
| 6,610,261 B1 | 8/2003 | Custodero et al. | |
| 6,747,087 B2 | 6/2004 | Custodero et al. | |
| 6,774,255 B1 | 8/2004 | Tardivat et al. | |
| 6,815,473 B2 | 11/2004 | Robert et al. | |
| 6,849,754 B2 | 2/2005 | Deschler et al. | |
| 7,199,175 B2 | 4/2007 | Vasseur | |
| 7,217,751 B2 | 5/2007 | Durel et al. | |

(Continued)

FOREIGN PATENT DOCUMENTS

| | | |
|---|---|---|
| CN | 1710007 A | 12/2005 |
| EP | 0649446 B1 | 4/1995 |
| EP | 1127909 A1 | 8/2001 |
| FR | 2765882 A1 | 1/1991 |
| FR | 2740778 A1 | 5/1997 |
| WO | 97/36724 A2 | 10/1997 |
| WO | 99/09036 A1 | 2/1999 |
| WO | 99/16600 A1 | 4/1999 |
| WO | 01/92402 A1 | 12/2001 |
| WO | 02/10269 A2 | 2/2002 |
| WO | 02/30939 A1 | 4/2002 |
| WO | 02/31041 A1 | 4/2002 |
| WO | 02/083782 A1 | 10/2002 |

(Continued)

OTHER PUBLICATIONS

Lonza, Product Information Lonzacure DETDA (Year: 2006).*

(Continued)

*Primary Examiner* — Doris L Lee

(74) *Attorney, Agent, or Firm* — Venable LLP

(57) ABSTRACT

A rubber composition exhibiting an improved processability/stiffness compromise is based on at least a diene elastomer, a reinforcing filler, a crosslinking system, between 1 and 30 parts by weight per hundred parts by weight of elastomer, phr, of an epoxy resin and between 1 and 15 phr of a specific amine-comprising hardener comprising in particular at least two primary amine functional groups located on at least one six-membered aromatic ring and at least two Ri radicals, which are identical or different, selected from the group consisting of linear or branched $C_1$-$C_6$ alkyl radicals, halogens, and ethers, tertiary amines, thioethers, ketones, esters and amides, substituted by linear or branched $C_1$-$C_6$ alkyl radicals, the said ring not comprising a hydrogen atom located in the ortho position with respect to the primary amine functional groups.

9 Claims, No Drawings

(56) References Cited

U.S. PATENT DOCUMENTS

| | | |
|---|---|---|
| 7,250,463 B2 | 7/2007 | Durel et al. |
| 7,312,264 B2 | 12/2007 | Gandon-Pain |
| 7,488,768 B2 | 2/2009 | Tardivat et al. |
| 7,820,771 B2 | 10/2010 | Lapra et al. |
| 8,344,063 B2 | 1/2013 | Marechal et al. |
| 8,455,584 B2 | 6/2013 | Robert et al. |
| 8,461,269 B2 | 6/2013 | Varagniat et al. |
| 8,492,475 B2 | 7/2013 | Araujo Da Silva et al. |
| 8,492,479 B2 | 7/2013 | Robert et al. |
| 8,877,839 B2 | 11/2014 | Veyland et al. |
| 8,883,929 B2 | 11/2014 | Gandon-Pain et al. |
| 8,957,155 B2 | 2/2015 | Seeboth et al. |
| 9,010,393 B2 | 4/2015 | Araujo Da Silva et al. |
| 9,714,339 B2 | 7/2017 | Veyland et al. |
| 2001/0036991 A1 | 11/2001 | Robert et al. |
| 2002/0183436 A1 | 12/2002 | Robert et al. |
| 2003/0065095 A1* | 4/2003 | Kaneko ............ C08G 59/5033 525/107 |
| 2003/0212185 A1 | 11/2003 | Vasseur |
| 2004/0051210 A1 | 3/2004 | Tardivat et al. |
| 2004/0132880 A1 | 7/2004 | Durel et al. |
| 2005/0004297 A1 | 1/2005 | Durel et al. |
| 2006/0089445 A1 | 4/2006 | Gandon-Pain |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-Pain et al. |
| 2010/0022714 A1 | 1/2010 | Varagniat et al. |
| 2010/0145089 A1 | 6/2010 | Mignani et al. |
| 2010/0184912 A1 | 7/2010 | Marechal et al. |
| 2010/0249270 A1 | 9/2010 | Robert et al. |
| 2010/0252156 A1 | 10/2010 | Robert et al. |
| 2011/0021702 A1 | 1/2011 | Gandon-Pain et al. |
| 2011/0294953 A1 | 12/2011 | Seeboth et al. |
| 2012/0283360 A1* | 11/2012 | Veyland .................... C08L 9/00 523/467 |
| 2014/0171564 A1* | 6/2014 | Torbruegge ........... B60C 1/0041 524/184 |
| 2015/0183983 A1 | 7/2015 | Veyland et al. |

FOREIGN PATENT DOCUMENTS

| | | |
|---|---|---|
| WO | 03/016387 A1 | 2/2003 |
| WO | 2004/096865 A2 | 11/2004 |
| WO | 2006/023815 A2 | 3/2006 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2007/061550 A1 | 5/2007 |
| WO | 2007/098080 A2 | 8/2007 |
| WO | 2008/003434 A1 | 1/2008 |
| WO | 2008/003435 A1 | 1/2008 |
| WO | 2008/055986 A2 | 5/2008 |
| WO | 2008/141702 A1 | 11/2008 |
| WO | 2009/000750 A1 | 12/2008 |
| WO | 2009/000752 A1 | 12/2008 |
| WO | 2010/072685 A1 | 7/2010 |
| WO | 2011/045342 A1 | 4/2011 |
| WO | WO 2012/028323 * | 9/2011 |
| WO | 2014/016346 A1 | 1/2014 |

OTHER PUBLICATIONS

S. Brunauer, et al., "Adsorption of Gases in Multimolecular Layers", The Journal of the American Chemical Society, 60, pp. 309-319(1938).

International Search Report dated Sep. 19, 2017, in corresponding PCT/FR2017/051749 (4 pages).

* cited by examiner

RUBBER COMPOSITION COMPRISING AN EPOXIDE RESIN AND A SPECIFIC AMINE HARDENER

BACKGROUND

The present invention relates to rubber compositions intended in particular for the manufacture of tyres or semi-finished products for tyres, in particular rubber compositions exhibiting a high stiffness.

It is known to use, in some parts of the tyres, rubber compositions exhibiting a high stiffness during small strains of the tyre, as presented in Application WO 02/10269. Resistance to small strains is one of the properties which a tyre has to exhibit in order to respond to the stresses to which it is subjected.

This stiffening can be obtained by increasing the content of reinforcing filler or by incorporating certain reinforcing resins in the constituent rubber compositions of the parts of the tyre.

The reinforcing resins conventionally used to increase the stiffness of the compositions are reinforcing resins based on a methylene acceptor/donor system. The terms "methylene acceptor" and "methylene donor" are well known to a person skilled in the art and are widely used to denote compounds capable of reacting together to generate, by condensation, a three-dimensional reinforcing resin which will become superimposed and interpenetrated with the reinforcing filler/elastomer network, on the one hand, and with the elastomer/sulfur network, on the other hand (if the crosslinking agent is sulfur). The methylene acceptor described above is combined with a hardener, capable of crosslinking or hardening it, also commonly known as "methylene donor". Crosslinking of the resin is then brought about, during the curing of the rubber matrix, by formation of methylene bridges between the carbons in the ortho and para positions of the phenolic nuclei of the resin and the methylene donor, thus creating a three-dimensional resin network.

Conventionally, the methylene acceptor is a phenolic resin. Phenolic novolac resins have already been described in rubber compositions, intended in particular for tyres or tyre treads, for applications as varied as adhesion or reinforcement: reference will be made, for example, to Patent EP 0 649 446. Furthermore, the methylene donors conventionally used are hexamethylenetetramine (abbreviated to HMT) or hexamethoxymethylmelamine (abbreviated to HMMM or H3M) or hexaethoxymethylmelamine.

However, the combination of a phenolic resin, methylene acceptor, with HMT or H3M, methylene donor, produces formaldehyde during the vulcanization of the rubber composition. In point of fact, it is desirable to reduce, indeed even to eliminate, in the long run, formaldehyde from rubber compositions due to the potential environmental impact of these compounds.

To this end, alternative compositions to the conventional compositions comprising the formaldehyde/phenol resin pair, methylene acceptor, with an HMT or H3M hardener, methylene donor, have been developed. By way of example, Application WO 2011/045342 describes compositions comprising an epoxy resin pair with an amine-comprising hardener. These compositions, in addition to the advantage of being freed from the formation of formaldehyde, exhibit, after crosslinking, greater stiffnesses than conventional compositions while retaining an acceptable rolling resistance. However, it is still desirable to improve the properties in the raw state of these compositions, in particular their processability, so as to facilitate the production of these compositions and to thus reduce the overall production costs, while maintaining a good level of stiffness.

SUMMARY

Unexpectedly, the Applicant Company has discovered, during its research studies, that the choice of a specific amine-comprising hardener with an epoxy resin makes it possible to improve the processability of rubber compositions before curing (in the raw state), in particular the scorch time or the viscosity of these compositions, with respect to the compositions used to date. Thus, the compositions in accordance with the present invention exhibit a processability/stiffness compromise which is far superior to that of the known compositions.

Consequently, a first subject-matter of the invention relates to a rubber composition based on at least:
- a diene elastomer;
- a reinforcing filler;
- a crosslinking system;
- between 1 and 30 parts by weight, per hundred parts by weight of elastomer, phr, of an epoxy resin;
- between 1 and 15 phr of an amine-comprising hardener comprising at least two primary amine functional groups located on at least one six-membered aromatic ring, the said at least one six-membered aromatic ring comprising:
  - at least one primary amine functional group, and
  - at least two Ri radicals, which are identical or different, selected from the group consisting of linear or branched $C_1$-$C_6$ alkyl radicals, halogens, and ethers, tertiary amines, thioethers, ketones, esters and amides, substituted by linear or branched $C_1$-$C_6$ alkyl radicals, so that the at least one six-membered aromatic ring does not comprise a hydrogen atom located in the ortho position with respect to the primary amine functional groups, the said amine-comprising hardener comprising at least one second primary amine functional group located on the said at least one six-membered aromatic ring or on a possible second six-membered aromatic ring of the said amine-comprising hardener.

Another subject-matter of the invention is finished or semi-finished rubber articles for tyres and tyres comprising a rubber composition in accordance with the invention, and also a process for the preparation of the composition according to the invention.

The invention and its advantages will be easily understood in the light of the description and implementational examples which follow.

DETAILED DESCRIPTION

Definitions

The expression "part by weight per hundred parts by weight of elastomer" (or phr) should be understood as meaning, within the meaning of the present invention, the part by weight per hundred parts by weight of elastomer or rubber.

In the present document, unless expressly indicated otherwise, all the percentages (%) shown are percentages (%) by weight.

Furthermore, any interval of values denoted by the expression "between a and b" represents the range of values extending from more than a to less than b (that is to say, limits a and b excluded), while any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferably denoted.

In the present document, the expression composition "based on" is understood to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof. By way of example, a composition based on an elastomeric matrix and on sulfur comprises the elastomeric matrix and the sulfur before curing, whereas, after curing, the sulfur is no longer detectable as the latter has reacted with the elastomeric matrix with the formation of sulfur (polysulfide, disulfide, monosulfide) bridges.

When reference is made to a "predominant" compound, this is understood to mean, within the meaning of the present invention, that this compound is predominant among the compounds of the same type in the composition, that is to say that it is the one which represents the greatest amount by weight among the compounds of the same type, for example more than 50%, 60%, 70%, 80%, 90%, indeed even 100%, by weight with respect to the total weight of the compound type. Thus, for example, a predominant reinforcing filler is the reinforcing filler representing the greatest weight with respect to the total weight of the reinforcing fillers in the composition. On the contrary, a "minor" compound is a compound which does not represent the greatest fraction by weight among the compounds of the same type.

Within the context of the invention, the carbon products mentioned in the description may be of fossil or biosourced origin. In the latter case, they may partially or completely result from biomass or be obtained from renewable starting materials resulting from biomass. Polymers, plasticizers, fillers, and the like, are in particular concerned.

Elastomeric Matrix

The composition of the tyre of the invention can comprise just one diene elastomer or a mixture of several diene elastomers.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). In the category of "essentially unsaturated" diene elastomers, a "highly unsaturated" diene elastomer is understood in particular to mean a diene elastomer having a content of units of diene origin (conjugated dienes) which is greater than 50%.

Given these definitions, diene elastomer capable of being used in the compositions in accordance with the invention is understood more particularly to mean:

(a) any homopolymer obtained by polymerization of a conjugated diene monomer having from 4 to 12 carbon atoms;
(b) any copolymer obtained by copolymerization of one or more conjugated dienes with one another or with one or more vinylaromatic compounds having from 8 to 20 carbon atoms;
(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d) a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units. The elastomers can have any microstructure, which depends on the polymerization conditions used, especially on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

To summarize, the diene elastomer of the composition can be selected, for example, from the group of highly unsaturated diene elastomers consisting of natural rubber (NR), synthetic polyisoprenes (IRs), polybutadienes (abbreviated to "BRs"), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds.

According to a specific preferred embodiment, the diene elastomer is a predominantly isoprene elastomer. "Isoprene elastomer" is understood to mean, in a known way, an isoprene homopolymer or copolymer, in other words a diene elastomer selected from the group consisting of natural rubber (NR), which may be plasticized or peptized, synthetic polyisoprenes (IRs), various isoprene copolymers and the mixtures of these elastomers. Mention will in particular be made, among isoprene copolymers, of isobutene/isoprene (butyl rubber IIR), isoprene/styrene (SIR), isoprene/butadiene (BIR) or isoprene/butadiene/styrene (SBIR) copolymers.

The diene elastomer is preferably selected from the group consisting of natural rubber, synthetic polyisoprenes and their mixtures. Use is preferably made, among these synthetic polyisoprenes, of polyisoprenes having a content (molar %) of cis-1,4-bonds of greater than 90%, more preferably still of greater than 98%. Preferably again, the diene elastomer is natural rubber.

Preferably, the content of diene elastomer, preferably of isoprene elastomer, preferably natural rubber, is from 50 to 100 phr, more preferably from 60 to 100 phr, more preferably from 70 to 100 phr, more preferably still from 80 to 100 phr and very preferably from 90 to 100 phr. In particular, the content of diene elastomer, preferably of isoprene elastomer, preferably again of natural rubber, is very preferably 100 phr.

Whether they comprise just one diene elastomer or a mixture of several diene elastomers, the compositions of the invention can be used in combination with any type of synthetic elastomer other than a diene elastomer, indeed even with polymers other than elastomers, for example thermoplastic polymers.

Reinforcing Filler

The composition of the tyre according to the invention advantageously comprises a reinforcing filler, known for its abilities to reinforce a rubber composition which can be used for the manufacture of tyres.

The reinforcing filler can comprise carbon black, an organic filler other than carbon black, an inorganic filler or the mixture of at least two of these fillers. Preferably, the reinforcing filler can comprise carbon black, a reinforcing inorganic filler, preferably silica, or a mixture of carbon black and of reinforcing inorganic filler, preferably silica. More preferably still, the reinforcing filler predominantly, indeed even exclusively, comprises carbon black, in particular in the case where the composition is used in an internal layer. The reinforcing filler can also predominantly comprise a reinforcing inorganic filler, in particular in the case where the composition is used in a tread.

Such a reinforcing filler typically consists of particles, the (weight-)average size of which is less than a micrometre, generally less than 500 nm, most often between 20 and 200 nm, in particular and more preferably between 20 and 150 nm.

The blacks which can be used in the context of the present invention can be any black conventionally used in tyres or their treads ("tyre-grade" blacks). Among the latter, mention will more particularly be made of the reinforcing carbon blacks of the 100, 200 and 300 series, or the blacks of the 500, 600 or 700 series (ASTM grades), such as, for example, the N115, N134, N234, N326, N330, N339, N347, N375, N550, N683 and N772 blacks. These carbon blacks can be used in the isolated state, as commercially available, or in any other form, for example as support for some of the rubber additives used. The carbon blacks might, for example, be already incorporated in the diene elastomer, in particular isoprene elastomer, in the form of a masterbatch (see, for example, Applications WO 97/36724 and WO 99/16600). The BET specific surface of the carbon blacks is measured according to Standard D6556-10 [multipoint (a minimum of 5 points) method—gas: nitrogen—relative pressure P/P0 range: 0.1 to 0.3].

Mention may be made, as examples of organic fillers other than carbon blacks, of functionalized polyvinyl organic fillers, such as described in Applications WO 2006/069792, WO 2006/069793, WO 2008/003434 and WO 2008/003435.

The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of pneumatic tyres, in other words capable of replacing, in its reinforcing role, a conventional tyre-grade carbon black; such a filler is generally characterized, in a known way, by the presence of hydroxyl (—OH) groups at its surface. In other words, without a coupling agent, the inorganic filler does not make it possible to reinforce, or to sufficiently reinforce, the composition and consequently does not come within the definition of "reinforcing inorganic filler".

Mineral fillers of the siliceous type, preferably silica ($SiO_2$), are suitable in particular as reinforcing inorganic fillers. The silica used can be any reinforcing silica known to a person skilled in the art, in particular any precipitated or fumed silica exhibiting a BET specific surface and also a CTAB specific surface both of less than 450 $m^2/g$, preferably from 30 to 400 $m^2/g$, in particular between 60 and 300 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/016387.

In the present account, as regards the silica, the BET specific surface is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure $p/p_0$ range: 0.05 to 0.17). The CTAB specific surface is the external surface determined according to French Standard NF T 45-007 of November 1987 (method B).

Mineral fillers of the aluminous type, in particular alumina ($Al_2O_3$) or aluminium (oxide) hydroxides, or also reinforcing titanium oxides, for example described in U.S. Pat. Nos. 6,610,261 and 6,747,087, are also suitable as reinforcing inorganic fillers.

The physical state in which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described above.

A person skilled in the art will understand that, as filler equivalent to the reinforcing inorganic filler described in the present section, a reinforcing filler of another nature, in particular organic nature, might be used provided that this reinforcing filler is covered with an inorganic layer, such as silica, or else comprises functional sites, in particular hydroxyl sites, at its surface requiring the use of a coupling agent in order to form the bond between the filler and the elastomer.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional.

A person skilled in the art can find coupling agent examples in the following documents: WO 02/083782, WO 02/30939, WO 02/31041, WO 2007/061550, WO 2006/125532, WO 2006/125533, WO 2006/125534, U.S. Pat. No. 6,849,754, WO 99/09036, WO 2006/023815, WO 2007/098080, WO 2010/072685 and WO 2008/055986.

The content of coupling agent is advantageously less than 12 phr, it being understood that it is generally desirable to use as little as possible of it. Typically, when a reinforcing inorganic filler is present, the content of coupling agent represents from 0.5% to 15% by weight, with respect to the amount of inorganic filler. Its content is preferably within a range extending from 0.5 to 12 phr, more preferably within a range extending from 4 to 8 phr. This content is easily adjusted by a person skilled in the art depending on the content of inorganic filler used in the composition.

According to the invention, when the reinforcing filler is present, the content of reinforcing filler, preferably the reinforcing filler predominantly, indeed even exclusively, comprising carbon black, can be within a range extending from 20 to 200 phr, preferably from 30 to 150 phr, preferably from 40 to 100 phr, preferably from 50 to 80 phr.

Epoxy Resin

The composition according to the invention comprises between 1 and 30 phr of an epoxy resin.

The epoxy resins which can be used in the present invention include all the polyepoxide compounds. They can concern, for example, aromatic epoxy, alicyclic epoxy and aliphatic epoxy resins. For example, the aromatic epoxy resin can be an amine-aromatic epoxy resin. These resins are preferably epoxy novolac resins, that is to say epoxy resins obtained by acid catalysis, in contrast to resol resins, which are obtained by basic catalysis.

In particular among aromatic epoxy compounds, preference is given to epoxy resins selected from the group consisting of 2,2-bis[4-(glycidyloxy)phenyl]propane, poly[(o-cresyl glycidyl ether)-co-formaldehyde], poly[(phenyl glycidyl ether)-co-formaldehyde], poly[(phenyl ether)-co-(hydroxybenzaldehyde glycidyl ether)] and the mixtures of these compounds.

Preferably again, the epoxy resin is selected from the group consisting of poly[(o-cresyl glycidyl ether)-co-formaldehyde], poly[(o-phenyl glycidyl ether)-co-formaldehyde], amine aromatic epoxy resins and the mixtures of these compounds.

Mention may be made, as example of commercially available epoxy resins which can be used in the context of the present invention, for example, of the epoxy resin DEN 439 from Uniqema, the epoxy resin tris(4-hydroxyphenyl) methane triglycidyl ether from Sigma-Aldrich or the epoxy cresol novolac resin Araldite ECN 1299 from Huntsman.

The amount of epoxy resin is between 1 and 30 phr. In view of the amine-comprising hardener used in the context of the present invention, below the minimum content of resin indicated, the targeted technical effect is insufficient whereas, above the maximum indicated, risks arise of an excessively great increase in the stiffness and of excessive damage to the hysteresis and to the Mooney plasticity. For all these reasons, the content of epoxy resin is between 10 and 25 phr. Preferably again, the content of resin in the composition according to the invention is between 15 and 20 phr.

Amine-Comprising Hardener

The epoxy resin of the composition of the invention is combined with a specific amine-comprising hardener which makes possible the crosslinking of the resin.

According to the invention, the amine-comprising hardener comprises at least two primary amine functional groups located on at least one (that is to say, one or more) six-membered aromatic ring, the said at least one six-membered aromatic ring comprising:

at least one primary amine functional group, and
at least two Ri radicals, which are identical or different, selected from the group consisting of linear or branched $C_1$-$C_6$ alkyl radicals, halogens, and ethers, tertiary amines, thioethers, ketones, esters and amides, substituted by linear or branched $C_1$-$C_6$ alkyl radicals,
so that the at least one six-membered aromatic ring does not comprise a hydrogen atom located in the ortho position with respect to the primary amine functional groups,
the said amine-comprising hardener comprising at least one second primary amine functional group located on the said at least one six-membered aromatic ring or on a possible second six-membered aromatic ring of the said amine-comprising hardener.

In other words, the amine-comprising hardener comprises one or more six-membered aromatic rings and at least two primary amine functional groups located on just one or distributed over several of these six-membered aromatic rings.

In a way well known to a person skilled in the art, primary amine functional group is understood to mean an amine-comprising functional group in which the nitrogen atom is bonded to two hydrogen atoms.

Preferably, the amine-comprising hardener comprises from 1 to 3, preferably again 1 or 2, six-membered aromatic rings.

Preferably, the amine-comprising hardener comprises from 2 to 4, preferably again 2, primary amine functional groups located on at least one six-membered aromatic ring of the amine-comprising hardener.

Mention may be made, among the halogens capable of constituting the Ri radicals, of fluorine, chlorine, bromine or iodine atoms. Preferably, the halogens are selected from the group consisting of chlorine and bromine atoms; preferably again, the halogens are chlorine atoms.

According to a first embodiment of the present invention, the amine-comprising hardener can comprise a six-membered aromatic ring comprising:
- at least two primary amine functional groups, and
- at least two Ri radicals, which are identical or different, selected from the group consisting of linear or branched $C_1$-$C_6$ alkyl radicals, halogens, and ethers, tertiary amines, thioethers, ketones, esters and amides, substituted by linear or branched $C_1$-$C_6$ alkyl radicals,
- so that the said ring does not comprise a hydrogen atom located in the ortho position with respect to the primary amine functional groups.

According to a second embodiment of the present invention, the amine-comprising hardener can also comprise at least two identical or different six-membered aromatic rings, the said rings each comprising:
- at least one primary amine functional group, and
- at least two Ri radicals, which are identical or different, selected from the group consisting of linear or branched $C_1$-$C_6$ alkyl radicals, halogens, and ethers, tertiary amines, thioethers, ketones, esters and amides, substituted by linear or branched $C_1$-$C_6$ alkyl radicals,
- so that the said rings do not comprise a hydrogen atom located in the ortho position with respect to the primary amine functional groups.

According to another embodiment, the amine-comprising hardener can also comprise several six-membered aromatic rings and at least two primary amine functional groups located solely on one of the aromatic rings.

When the amine-comprising hardener comprises several (that is to say, at least two) six-membered aromatic rings, these rings can be identical or different. They can, for example, differ from one another in the nature of the atoms constituting the said rings and/or in the number of primary amine functional groups located on the said rings and/or in the nature and/or the number of the Ri radicals positioned on the said rings and/or in the position of the primary amine functional groups and Ri radicals on the said rings. Preferably, when the amine-comprising hardener comprises several six-membered aromatic rings, these rings are identical.

As indicated above, the amine-comprising hardener comprises at least two Ri radicals, which are identical or different, selected from the group consisting of linear or branched $C_1$-$C_6$ alkyl radicals, halogens, and ethers, tertiary amines, thioethers, ketones, esters and amides, substituted by linear or branched $C_1$-$C_6$ alkyl radicals. In the expression "ethers, tertiary amines, thioethers, ketones, esters and amides, substituted by linear or branched $C_1$-$C_6$ alkyl radicals", a person skilled in the art clearly understands that the terms "substituted by linear or branched $C_1$-$C_6$ alkyl radicals" relate to each of the ethers, tertiary amines, thioethers, ketones, esters and amides.

Whatever the embodiment of the present invention, the amine-comprising hardener preferably comprises at least two Ri radicals, which are identical or different, selected from the group consisting of linear or branched $C_1$-$C_6$ alkyl radicals, halogens, and ethers, tertiary amines and thioethers, substituted by linear or branched $C_1$-$C_6$ alkyl radicals. Preferably again, the amine-comprising hardener comprises at least two Ri radicals, which are identical or different, selected from the group consisting of linear or branched $C_1$-$C_6$ alkyl radicals, halogens and thioethers, substituted by linear or branched $C_1$-$C_6$ alkyl radicals.

Whatever the embodiment of the present invention, the Ri radicals, which are identical or different, are selected from the group consisting of the linear or branched $C_1$-$C_6$ alkyl radicals. In other words, all the Ri radicals of the amine-comprising hardener can be linear or branched $C_1$-$C_6$ alkyl radicals, the linear or branched $C_1$-$C_6$ alkyl radicals preferably being selected from the group consisting of the methyl, ethyl and propyl radicals.

Whatever the embodiment of the present invention, the at least one six-membered aromatic ring of the amine-comprising hardener can comprise at least two Ri radicals, which are identical or different, selected from the group consisting of halogens, and ethers, tertiary amines and thioethers, substituted by linear or branched $C_1$-$C_6$ alkyl radicals, and at least one Ri radical selected from the group consisting of linear or branched $C_1$-$C_6$ alkyl radicals.

Whatever the embodiment of the present invention, whether the Ri radicals or the radicals of the ethers, tertiary amines, thioethers, ketones, esters or amides are concerned, the linear or branched $C_1$-$C_6$ alkyl radicals can be selected from the group consisting of the methyl, ethyl, propyl, isopropyl, isobutyl and butyl radicals. Preferably, the linear or branched $C_1$-$C_6$ alkyl radicals are selected from the group consisting of the methyl, ethyl and propyl radicals. Preferably again, the linear or branched $C_1$-$C_6$ alkyl radicals are selected from the group consisting of the methyl and ethyl radicals.

Whatever the embodiment of the present invention, the atoms of the aromatic rings of the amine-comprising hardener can be carbon atoms, and can optionally comprise nitrogen atoms. Preferably, all the atoms of the aromatic rings of the amine-comprising hardener are carbon atoms. In other words, the six-membered aromatic rings of the amine-comprising hardener are preferably aromatic rings comprising six carbon atoms.

In the formulae (I) to (V) presented below, it should be remembered that the Ri radicals can be identical or different.

According to the first embodiment of the present invention, the amine-comprising hardener can correspond to the formula (I):

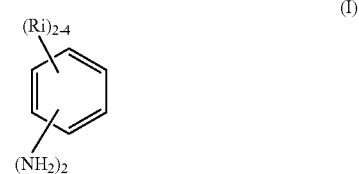

(I)

Preferably, according to this embodiment, the amine-comprising hardener corresponds to the formula (II):

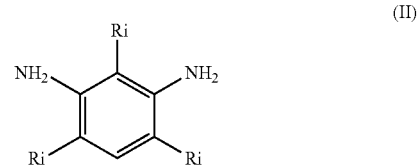

(II)

According to the second embodiment of the present invention, the amine-comprising hardener can also correspond to the formula (III):

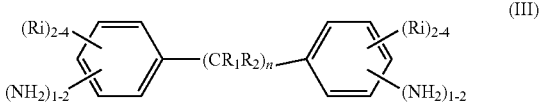

in which:

n represents an integer ranging from 0 to 4, preferably from 1 to 3, $R_1$ and $R_2$, which are identical or different, are selected from the group consisting of a hydrogen atom and a methyl, ethyl, isobutyl and benzyl group; preferably, $R_1$ and $R_2$ both represent a hydrogen atom.

Preferably, according to this embodiment, the amine-comprising hardener corresponds to the formula (IV):

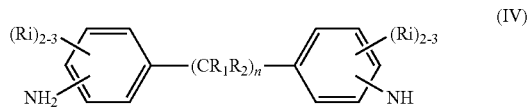

in which:

n represents 1 or 2, preferably 1, $R_1$ and $R_2$, which are identical or different, are selected from the group consisting of a hydrogen atom and a methyl, ethyl, isobutyl and benzyl group; preferably, $R_1$ and $R_2$ both represent a hydrogen atom.

Preferably again, according to this embodiment, the amine-comprising hardener corresponds to the formula (V):

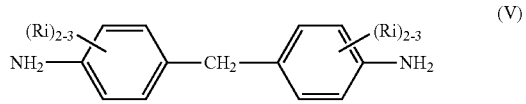

Very preferably, according to the invention, the amine-comprising hardener is selected from the group consisting of the compounds below and the mixtures of these compounds:

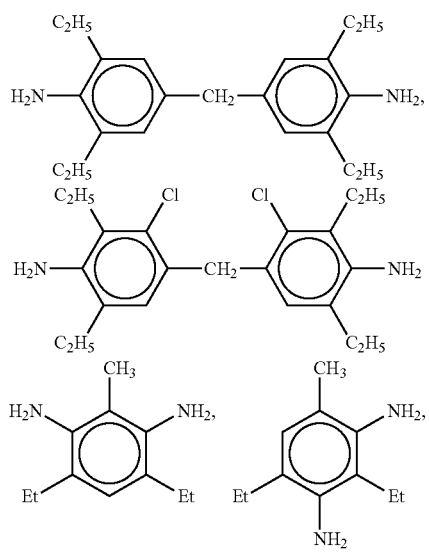

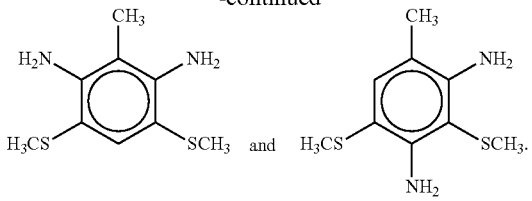

Mention may be made, as example of commercially available amine-comprising hardeners which can be used in the context of the present invention, for example, of Ethacure 100 or Ethacure 300 from Albemarle or Lonzacure DETDA, Lonzacure MDEA or Lonzacure MCDEA from Lonza.

The amount of amine-comprising hardener is between 1 and 15 phr. Below the minimum indicated, the targeted technical effect has proved to be insufficient whereas, above the maximum indicated, risks arise of the processing in the raw state of the compositions being disadvantaged. Advantageously, the content of amine-comprising hardener is within a range extending from 5 to 10 phr, preferably from 2 to 8 phr.

Various Additives

The rubber compositions in accordance with the invention can also comprise all or some of the usual additives customarily used in elastomer compositions, such as, for example, pigments, protective agents, such as antiozone waxes, chemical antiozonants or antioxidants, plasticizing agents, antifatigue agents, reinforcing resins, a crosslinking system based either on sulfur or on sulfur donors and/or on peroxide and/or on bismaleimides, vulcanization accelerators or vulcanization activators.

These compositions can also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

When the composition according to the invention is a tyre internal layer composition, it is advantageously devoid of antioxidant.

When the composition according to the invention is a tyre internal layer composition, it can be devoid of plasticizing agent or contain less than 5 phr, preferably less than 1 phr, thereof. Alternatively and according to an embodiment which is also preferred, the composition of the tyre according to the invention additionally comprises a plasticizing agent. Preferably, this plasticizing agent is a solid hydrocarbon resin (or plasticizing resin), an extending oil (or plasticizing oil) or a mixture of the two.

Furthermore, the composition of the tyre according to the invention can comprise a cobalt salt, in particular in the case where it is used in an internal layer. In addition, the Applicant Company has found, surprisingly, that the amine-comprising hardeners comprising at least one six-membered aromatic ring comprising at least one Ri radical selected from the group consisting of halogens, and ethers, tertiary amines, thioethers, ketones, esters and amides, substituted by linear or branched $C_1$-$C_6$ alkyl radicals, are particularly effective in compositions comprising a cobalt salt. Thus, preferably, the composition according to the invention comprises a cobalt salt and an amine-comprising hardener comprising at least one Ri radical selected from the group consisting of halogens, and ethers, tertiary amines, thioethers, ketones, esters and amides, substituted by linear or branched $C_1$-$C_6$ alkyl radicals. The cobalt salt can be selected, for example, from the group consisting of abietates, acetylacetonates, tallates, naphthenates, resinates and the mixtures of these compounds. The content of cobalt salt can, for example, be between 0.1 and 6 phr, for example between 0.3 and 4 phr, for example between 0.5 and 2.5 phr.

Advantageously, the composition according to the invention comprises a crosslinking system. The crosslinking system is preferably based on sulfur and on a primary vulcanization accelerator, in particular on an accelerator of the sulfenamide type. Additional to this vulcanization system are various known secondary vulcanization accelerators or vulcanization activators, such as zinc oxide, stearic acid, guanidine derivatives (in particular diphenylguanidine), and the like, incorporated during the first non-productive phase and/or during the productive phase. The sulfur content is preferably between 0.5 and 10.0 phr and the content of the primary accelerator is preferably between 0.5 and 5.0 phr.

Use may be made, as (primary or secondary) accelerator, of any compound capable of acting as accelerator of the vulcanization of diene elastomers in the presence of sulfur, in particular accelerators of the thiazole type and their derivatives and accelerators of the thiuram and zinc dithiocarbamate types. These accelerators are more preferably selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenami de (abbreviated to "TBBS"), N-(tert-butyl)-2-benzothiazole-sulfenimide (abbreviated to "TBSI"), zinc dibenzyldithiocarbamate (abbreviated to "ZBEC") and the mixtures of these compounds. Preferably, use is made of a primary accelerator of the sulfenamide type.

Tyres

The invention relates in particular to tyres intended to equip motor vehicles of passenger vehicle type, SUVs ("Sport Utility Vehicles"), or two-wheel vehicles (in particular motorcycles), or aircraft, or also industrial vehicles chosen from vans, heavy-duty vehicles—that is to say, underground trains, buses, heavy road transport vehicles (lorries, tractors, trailers) or off-road vehicles, such as heavy agricultural vehicles or earthmoving equipment—, and others.

It is possible to define, within the tyre, three types of regions:
  The radially exterior region in contact with the ambient air, this region being essentially composed of the tread and of the external sidewall of the tyre. An external sidewall is an elastomeric layer positioned outside the carcass reinforcement with respect to the internal cavity of the tyre, between the crown and the bead, so as to completely or partially cover the region of the carcass reinforcement extending from the crown to the bead.
  The radially interior region in contact with the inflation gas, this region generally being composed of the layer airtight to the inflation gases, sometimes known as interior airtight layer or inner liner.
  The internal region of the tyre, that is to say that between the exterior and interior regions. This region includes layers or plies which are referred to here as internal layers of the tyre. These are, for example, carcass plies, tread underlayers, tyre belt plies or any other layer which is not in contact with the ambient air or the inflation gas of the tyre.

The composition defined in the present description is particularly well suited to the internal layers and to the tread of the tyres.

According to a preferred embodiment of the invention, the rubber composition described above can be used in the tyre as a stiff elastomer layer in at least one part of the tyre.

Consequently, in the tyre according to the present invention, the composition according to the invention can be present in at least one layer chosen from an internal layer and the tread. According to the invention, the internal layer can be selected from the group consisting of carcass plies, crown plies, bead-wire fillings, crown feet, decoupling layers, the tread underlayer and the combinations of these internal layers. Preferably, the internal layer is selected from the group consisting of carcass plies, crown plies, bead-wire fillings, crown feet, decoupling layers and the combinations of these internal layers.

The invention relates to the tyres and semi-finished products for tyres described above, articles made of rubber, both in the raw state (that is to say, before curing) and in the cured state (that is to say, after crosslinking or vulcanization).

Preparation of the Rubber Compositions

The compositions used in the treads of the invention can be manufactured in appropriate mixers, using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing such compositions comprises, for example, the following stages:
  a) incorporating a reinforcing filler in a diene elastomer during a first stage (named "non-productive" stage), everything being kneaded thermomechanically (for example, in one or more goes), until a maximum temperature of between 110° C. and 190° C. is reached;
  b) cooling the combined mixture to a temperature of less than 100° C.;
  c) subsequently incorporating, during a second stage (named "productive" stage), a crosslinking system;
  d) kneading everything up to a maximum temperature of less than 110° C.

Between 1 and 30 phr of the epoxy resin and between 1 and 15 phr of the amine-comprising hardener can introduced, independently of one another, either during the non-productive phase (a) or during the productive phase (c). Preferably, the epoxy resin is introduced during the non-productive phase (a) and the hardener during the productive phase (c).

By way of example, the non-productive phase is carried out in a single thermomechanical stage during which, in a first step, all the necessary base constituents (a diene elastomer, reinforcing filler and optionally between 1 and 20 phr of an epoxy resin and between 1 and 15 phr of an amine-comprising hardener) are introduced into an appropriate mixer, such as a standard internal mixer, followed, in a second step, for example after kneading for one to two minutes, by the other additives, optional additional agents for covering the filler or optional additional processing aids, with the exception of the crosslinking system. The total duration of the kneading, in this non-productive phase, is preferably between 1 and 15 min.

The first kneading stage is generally carried out by incorporating the reinforcing filler in the elastomer in one or more doses while thermomechanically kneading. In the case where the reinforcing filler, in particular the carbon black, is already incorporated in all or in part in the elastomer in the form of a masterbatch, as is described, for example, in Applications WO 97/36724 and WO 99/16600, it is the masterbatch which is kneaded directly and, if appropriate, the other elastomers or reinforcing fillers present in the composition which are not in the masterbatch form, and also the additives other than the crosslinking system, are incorporated.

After cooling the mixture thus obtained, the crosslinking system is then incorporated in an external mixer, such as an open mill, maintained at a low temperature (for example between 40° C. and 100° C.). The combined mixture is then mixed (productive phase) for a few minutes, for example between 2 and 15 min.

The final composition thus obtained can subsequently be calendered, for example in the form of a sheet or of a plaque, in particular for a laboratory characterization, or else extruded, for example in order to form a rubber profiled element used in the manufacture of a tyre.

EXAMPLES

I. Measurements and Tests Used

I.1 Scorch Time

The measurements are carried out at 130° C. or 115° C., in accordance with French Standard NF T 43-005. The change in the consistometric index as a function of time makes it possible to determine the scorch time of the rubber compositions, assessed in accordance with the abovementioned standard, by the parameter T5 (case of a large rotor), expressed in minutes, and defined as being the time necessary to obtain an increase in the consistometric index (expressed in MU) of 5 units above the minimum value measured for this index.

It should be remembered that, in a way well known to a person skilled in the art, the greater the consistometric index as a function of time, the more the crosslinking of the material will be delayed before curing.

1.2 Mooney Plasticity

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton·metre).

It should be remembered that, in a way well known to a person skilled in the art, the lower the Mooney plasticity, the easier the material is to work. Of course, beyond a certain value (e.g., 20 MU), the material becomes too liquid to be usable, in particular for manufacturing internal layers.

1.3 Dynamic Properties

The dynamic properties $G^*(2\%)$ are measured on a viscosity analyser (Metravib VA4000) according to Standard ASTM D 5992-96. The response of a sample of vulcanized composition (cylindrical test specimen with a thickness of 4 mm and a cross-section of 400 $mm^2$), subjected to a simple alternating sinusoidal shear stress, at a frequency of 10 Hz, under standard temperature conditions (23° C.) according to Standard ASTM D 1349-99 or, as the case may be, at a different temperature, is recorded. A strain amplitude sweep is carried out from 0.1% to 50% (outward cycle) and then from 50% to 1% (return cycle). The result made use of is the complex dynamic shear modulus $G^*$. For the return cycle, the complex dynamic shear modulus $G^*(2\%)$ at 2% strain, at 40° C., is shown.

It should be remembered that the value of $G^*(2\%)$ return at 40° C. is representative of the stiffness of the material: the greater $G^*(2\%)$ at 40° C. is, the stiffer the material.

II. Preparation of the Compositions

The tests which follow are carried out in the following way: the diene elastomer, the reinforcing filler, between 1 and 30 phr of the epoxy resin, and also the various other ingredients, with the exception of the vulcanization system, are successively introduced into an internal mixer (final degree of filling: approximately 70% by volume), the initial vessel temperature of which is approximately 60° C. Thermomechanical working is then carried out (non-productive phase) in one stage, which lasts in total approximately from 3 to 4 min, until a maximum "dropping" temperature of 165° C. is reached.

The mixture thus obtained is recovered and cooled and then sulfur, an accelerator of sulfenamide type and between 1 and 15 phr of the amine-comprising hardener are incorporated on a mixer (homofinisher) at 30° C., everything being mixed (productive phase) for an appropriate time (for example between 5 and 12 min).

The compositions thus obtained are subsequently calendered, either in the form of plaques (thickness of 2 to 3 mm) or of thin sheets of rubber, for the measurement of their physical or mechanical properties, or extruded in the form of a profiled element.

III. Tests on Rubber Compositions

Eleven rubber compositions were prepared as indicated above, seven in accordance with the invention (hereinafter denoted C.5 to C.11) and four not in accordance (control compositions, hereinafter denoted C.1 to C.4). Their formulations (in phr) and their properties have been summarized in Table 1 below.

With the exception of the control composition C.1, the compositions presented in this Table 1 do not result in the formation of formaldehyde during the curing.

The compositions C.2 to C.11 contain an epoxy resin (two different resins were tested) and a polyamine-comprising hardener as replacement for the phenol/formaldehyde resin/HMT hardener(s) pair present in the conventional control composition C.1. The compositions C.5 to C.11 in accordance with the present invention contain amine-comprising hardeners which are different from the amine-comprising hardeners of the control compositions C.2 to C.4.

The results, based on the scorch time and on $G^*(2\%)$, are presented on base 100 with respect to the control composition C.1. The Mooney plasticity results are presented in absolute value.

TABLE 1

| Constituent | C.1 | C.2 | C.3 | C.4 | C.5 | C.6 | C.7 | C.8 | C.9 | C.10 | C.11 |
|---|---|---|---|---|---|---|---|---|---|---|---|
| NR (1) | 100 | 100 | 100 | 100 | 100 | 100 | 100 | 100 | 100 | 100 | 100 |
| Carbon black (2) | 70 | 70 | 70 | 70 | 70 | 70 | 70 | 70 | 70 | 70 | 70 |
| ZnO (3) | 3 | 3 | 3 | 3 | 3 | 3 | 3 | 3 | 3 | 3 | 3 |
| 6PPD (4) | 2.5 | 2.5 | 2.5 | 2.5 | 2.5 | 2.5 | 2.5 | 2.5 | 2.5 | 2.5 | 2.5 |
| Stearic acid (5) | 2 | 2 | 2 | 2 | 2 | 2 | 2 | 2 | 2 | 2 | 2 |
| Sulfur | 3 | 3 | 3 | 3 | 3 | 3 | 3 | 3 | 3 | 3 | 3 |
| CBS (6) | 2 | 2 | 2 | 2 | 2 | 2 | 2 | 2 | 2 | 2 | 2 |
| Phenol/formaldehyde resin (7) | 12 | — | — | — | — | — | — | — | — | — | — |
| HMT (8) | 4 | — | — | — | — | — | — | — | — | — | — |
| Epoxy resin (9) | — | 12 | — | 12 | 12 | 12 | 16 | — | 12 | — | 12 |
| Epoxy resin (10) | — | — | 12 | — | — | — | — | 12 | — | 12 | — |
| Control hardener (11) | — | 4 | 4 | — | — | — | — | — | — | — | — |
| Control hardener (12) | — | — | — | 4 | — | — | — | — | — | — | — |
| Hardener (13) | — | — | — | — | 4 | — | — | — | — | — | — |
| Hardener (14) | — | — | — | — | — | 4 | 4 | 4 | — | — | — |
| Hardener (15) | — | — | — | — | — | — | — | — | 4 | 4 | — |
| Hardener (16) | — | — | — | — | — | — | — | — | — | — | 4 |
| Scorch time | 100 | 51 | 87 | 145 | 270 | 177 | 159 | 209 | 125 | 97 | 152 |
| Mooney plasticity (MU) | 46 | 77 | 79 | 62 | 47 | 39 | 26 | 38 | 31 | 39 | 38 |
| G*(2%) return at 40° C. | 100 | 109 | 103 | 101 | 116 | 102 | 104 | 102 | 98 | 101 | 86 |

(1) Natural rubber
(2) Carbon black N326 (name according to Standard ASTM D-1765)
(3) Zinc oxide (industrial grade - Umicore)
(4) N-(1,3-Dimethylbutyl)-N-phenyl-para-phenylenediamine (Santoflex 6-PPD from Flexsys)
(5) Stearin (Pristerene 4931 from Uniqema)
(6) N-Cyclohexylbenzothiazolesulfenamide (Santocure CBS from Flexsys)
(7) Phenol/formaldehyde novolac resin (Peracit 4536K from Perstorp)
(8) Hexamethylenetetramine (from Degussa)
(9) Epoxy resin (DEN 439 from Uniqema)
(10) Epoxy resin (tris(4-hydroxyphenyl)methane triglycidyl ether from Sigma-Aldrich)
(11) 1,3-Bis(aminomethyl)cyclohexane (from Sigma-Aldrich)
(12) meta-Phenylenediamine from Sigma-Aldrich
(13) Lonzacure DETDA from Lonza
(14) Ethacure 300 from Albemarle
(15) Lonzacure MDEA from Lonza
(16) Lonzacure MCDEA from Lonza It is noted that the use of an epoxy resin and a polyamine-comprising hardener in the compositions C.5 to C.11 in accordance with the present invention makes it possible to obtain an improved Mooney plasticity, with respect to the phenol/formaldehyde resin/HMT hardener(s) pair of the control composition C.1, but also with respect to the epoxy resin/polyamine-comprising hardener pair of the control compositions C.2 to C.4. Furthermore, the compositions in accordance with the present invention additionally make it possible to obtain a scorch time which is improved or at least equivalent to that of the control composition C.1, while retaining an equivalent stiffness to that of the control compositions C.1 to C.4.

To sum up, the results of these tests demonstrate that the use of an epoxy resin and of a specific polyamine-comprising hardener in the compositions of the invention makes it possible to obtain rubber compositions, the processability/stiffness compromise of which is far superior to that of a conventional composition, or of compositions comprising other amine-comprising hardeners, not in accordance with the present invention.

These tests illustrate rubber compositions which can be used especially in internal mixtures, such as carcass plies, crown plies, bead-wire fillings, crown feet, decoupling layers or the tread underlayer, in particular in carcass plies, crown plies, bead-wire fillings, crown feet, decoupling layers, regions requiring a high stiffness with low strain.

The invention claimed is:

1. A tire comprising a rubber composition based on at least:
   a diene elastomer;
   a reinforcing filler;
   a crosslinking system;
   between 10 and 16 parts by weight, per hundred parts by weight of elastomer, phr, of an epoxy resin; and
   between 2 and 8 phr of an amine-comprising hardener selected from the group consisting of

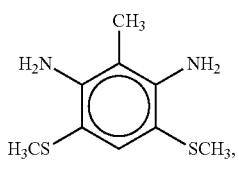 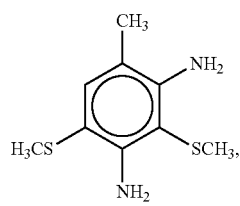

and mixtures thereof,
   wherein the epoxy resin is tris(4-hydroxyphenyl)methane triglycidyl ether and poly[(phenyl glycidyl ether) co formaldehyde], and
   wherein the rubber composition is present in at least one layer chosen from a tread and an internal layer of the tire.

2. The rubber composition according to claim 1, wherein the diene elastomer is selected from the group consisting of natural rubber, synthetic polyisoprenes, polybutadienes, butadiene copolymers, isoprene copolymers and mixtures thereof.

3. The rubber composition according to claim 1 further comprising between 0.1 and 6 phr of cobalt salt.

4. The tire according to claim 1, in which the internal layer is selected from the group consisting of carcass plies, crown plies, bead-wire fillings, crown feet, decoupling layers, tread underlayer and combinations thereof.

5. The rubber composition according to claim 1, wherein an amount of reinforcing filler is between 20 and 200 phr.

6. The rubber composition according to claim 5, wherein the amount of reinforcing filler is between 30 and 150 phr.

7. The rubber composition according to claim 1, wherein the reinforcing filler comprises carbon black, a reinforcing inorganic filler or a mixture of carbon black and a reinforcing inorganic filler.

8. The rubber composition according to claim 7, wherein the reinforcing filler predominantly comprises carbon black.

9. A process for preparing a rubber composition according to claim 1 comprising the following steps:
   (a) incorporating the reinforcing filler in the diene elastomer to form a mixture during a first non-productive stage by thermomechanically kneading until a maximum temperature of between 110° C. and 190° C. is reached;
   (b) cooling the mixture to a temperature of less than 100° C.;
   (c) then incorporating, during a second productive stage, a crosslinking system;
   (d) kneading the mixture up to a maximum temperature of less than 110° C.; and
   (e) incorporating the epoxy resin and the amine-comprising hardener independently of one another during step (a) or step (c).

\* \* \* \* \*